3,156,731
STABILIZATION OF VINYLCYCLO-
ALKANETHIOLS
Vernon R. Ratzlow and Charles A. Ray, Jr., Phillips, Tex.,
assignors to Phillips Petroleum Company, a corporation
of Delaware
No Drawing. Filed Feb. 23, 1961, Ser. No. 90,919
17 Claims. (Cl. 260—609)

This invention relates to a stabilized vinylcycloalkanethiol. In one aspect of the invention the invention relates to a method for stabilizing a vinylcycloalkanethiol. In another aspect the invention relates to a method for inhibiting the polymerization of the monomercaptan of a vinyl substituted cyclic alkene.

It is known that difficulties are encountered in the retention of vinylcycloalkanethiol compounds because of their tendency to polymerize at normal storage temperatures. Although all of the products of the reaction have not definitely been established, it is known that in the formation of vinylcycloalkanethiol compounds, such as vinylcyclohexanethiol, fractions which are predominantly monomercaptans and fractions which are predominantly dimercaptans are present in the product. It is believed that it is the monomercaptan fraction which is unstable and polymerizes to a viscous oil of unknown structure. The dimercaptan appears to be stable. Various means have been used such as cold storage and the use of various polymerization inhibitors in an attempt to prevent the polymerization. This invention relates to a method of stabilizing the monomercaptan of vinylcycloalkenes.

An object of this invention is to provide a stable vinylcycloalkanethiol.

Another object of this invention is to provide a method for stabilizing a vinylcycloalkanethiol.

Still another object of this invention is to provide a process for inhibiting the polymerzation of a vinylcycloalkanethiol.

Yet another object is to inhibit the polymerization of a monomercaptan of vinylcyclohexene.

Other aspects, objects and the several advantages of this invention will be apparent from a study of the disclosure and the appended claims.

These objects are broadly accomplished by incorporating into a vinylcycloalkanethiol compound a stabilizing amount of an organic polysulfide.

In one aspect of the invention, the stabilizer contains free sulfur.

The process of this invention is applicable to vinyl substituted cyclic alkane compounds containing a mercaptan group or mixtures of such compounds. Preferred polymerizable vinylcycloalkanethiol compounds which can be stabilized in accordance with my invention are the compounds represented by the following structural formulas:

(1) 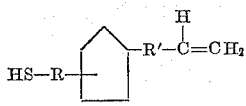

and (2) 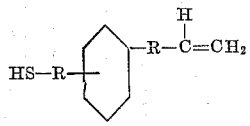

wherein the vinyl and monomercaptan groups may be located on any position on the ring, and R and R' are alkylene groups with the number of carbon atoms in the combined alkylene groups generally not greater than 10. R and R' may also be absent with the vinyl and monomercaptan groups having direct linkages to the ring. Preferred compounds include 3-vinylcyclohexanethiol, 4-vinylcyclohexanethiol, and 2-vinylcyclopentanethiol.

Examples of other vinylcycloalkanethiol compounds which are stabilized by the method of this invention include (3-vinylcyclohexyl)methanethiol, (4-vinylcyclohexyl)methanethiol, (3-vinylcyclohexyl)ethanethiol, 4-(3-butenyl)cyclohexanethiol, 3-(7-octenyl)cyclohexanethiol, 2 - (9 - decenyl)cyclopentanethiol, (3 - vinylcyclopentyl)-methanethiol, 6-[2-(5-hexenyl)cyclohexyl]hexanothiol, 4-ethyl-6-(3-vinylcyclohexyl)hexanethiol and the like.

The organic polysulfides employed in accordance with this invention as stabilizers for vinylcycloalkanethiols are of the type $R'S_xR''$ wherein $R'$ and $R''$ represent the same or different organic radicals and $x$ is an integer from 3 to 10, preferably 3 to 8. We prefer polysulfides wherein $R'$ and $R''$ are alkyl radicals having from 1 to 12 carbon atoms and particularly preferred are polysulfides wherein $R'$ and $R''$ are normal butyl or tertiary butyl groups. The most preferred stabilizers are ditertiary butyl polysulfide and dinormal butyl polysulfide. Examples of other preferred polysulfides include disecondary butyl polysulfide, diisobutyl polysulfide, mixed butyl isomers of polysulfides, dipropylpolysulfide, diisopropylpolysulfide and mixed propyl isomers of polysulfide. Other polysulfides are those wherein $R'$ and/or $R''$ is an aryl, alkyl, acyl, thioacyl, carbamyl, thiocarbamyl, thiazolyl or substituted thiazolyl radical. Aminoalkyl, nitroalkyl, aralkyl, chloroalkyl, alkenyl, furyl, tetrahydrofuryl, pyridyl, quinolyl, pyranyl, and indolyl are included. Others are di-2-ethylhexyl pentasulfide, didodecyl tetrasulfide, benzothiazolyl-2-o-nitrophenyl trisulfide, difuroyl tetrasulfide, dicyclohexyl pentasulfide, di-o-tolyl trisulfide, bis-(4-phenyl-2-thiozolyl)trisulfide, didodecyl pentasulfide, and dibutyl pentasulfide.

A method known to those skilled in the art for the production of a polysulfide, such as ditertiary butyl polysulfide, is the reaction of sulfur with ditertiary butyl disulfide in a ratio of three moles per mole of ditertiary butyl disulfide in the presence of $P_2S_5$ as a catalyst. The resultant polysulfide is a mixture of various polysulfides with the determination of the amount of combined sulfur being difficultly determinable due to the presence of a significant portion of dissolved free sulfur. This mixture of polysulfide is believed to contain a large amount of polysulfide with 4 or 5 sulfur atoms per molecule. Although free sulfur has a limited solubility in some vinylcycloalkanethiols, the addition of elemental sulfur to the polysulfide is within the scope of the invention. It is not necessary, however, to add additional sulfur; in fact, as hereinbefore discussed, the polysulfide generally contains some free sulfur.

The amount of polysulfide incorporated in the vinylcycloalkanethiol can be readily determined by one skilled in the art and depends on the particular polysulfide and unstable compound employed; however, the amount is generally in the range of 0.01 to 5.0 weight percent polysulfide weight based on the vinylcycloalkanethiol compound. Preferably, the range is 0.05 to 2.0, even more preferably the range is 0.075 to 1.0.

Preferably, the inhibitor is added after the formation of the vinylcycloalkanethiol compound, although it is within the scope of this invention to add the polysulfide during the formation thereof.

The following examples will serve to illustrate the method of this invention for preparing a stabilized vinylcycloalkanethiol. The examples are for the purposes of illustration only and are in no sense limitative of the invention.

The monomercaptan of vinylcyclohexane used in the following examples was produced by reacting hydrogen sulfide and vinylcyclohexene in a stainless steel reactor equipped with a means for irradiating the reactants with ultraviolet light. The following conditions prevailed:

(1) Hydrogen sulfide-vinylcyclohexene ratio __ 3.0
(2) Temperature _____ °F__ 80
(3) Pressure _____ p.s.i.g__ 200-400
(4) Time _____ hours__ 3

The reactor effluent was analyzed as follows:

|  | Volume percent |
|---|---|
| Vinylcyclohexene | 16.5 |
| Monomercaptan of vinylcyclohexene | 30.5 |
| Dimercaptan of vinylcyclohexene | 18.0 |
| Heavies (probably sulfides) | 33.5 |
| $H_2S$ | 1.5 |
|  | 100.0 |

The ditertiarybutyl polysulfide of the examples was produced by the addition of sulfur to ditertiarybutyl mercaptan with phosphorus pentasulfide as the catalyst. A mole ratio of 2 parts sulfur to 1 part mercaptan was mixed with 0.5 weight percent catalyst and heated while stirring at 300° F. for 24 hours. The reactor pressure varied between 60 and 100 p.s.i.g. due to impurities in the $H_2S$. The unreacted mercaptan was then flashed off leaving the polysulfide as a kettle product. Free sulfur was removed by filtering. The yield was about 85 percent of theoretical. The total sulfur content of the polysulfide was about 61 weight percent as determined by ASTM Method No. D1551-58T. This would indicate about 5-6 atoms of sulfur per mole although it is possible that a portion of the sulfur was in physical solution in the polysulfide.

The dinormalbutyl polysulfide used in the examples was prepared by reacting sulfur with dinormalbutyl monosulfide in a 4 to 1 mole ratio with 1.0 weight percent phosphorus pentasulfide as a catalyst. The reactants were heated while stirring at 350-400° F. for 20 hours at a maximum pressure of 100 p.s.i.g. After cooling the reaction mixture the unreacted sulfur was removed by filtration and the filtrate vacuum flashed to remove volatile compounds.

EXAMPLE I

To the above vinylcyclohexanethiol was added 0.1 weight percent ditertiary butyl polysulfide. The material was then analyzed for mercaptan sulfur content and amount of polymerization initially and after storage at ambient laboratory temperature.

Table I

|  | Original Material, 0 days | Control, No Inhibitor | | | 0.1 wt. Percent Ditertiarybutylpolysulfide | | |
|---|---|---|---|---|---|---|---|
|  |  | 15 days | 51 days | 127 days | 15 days | 51 days | 127 days |
| Mercaptan sulfur content, wt. percent [1] | 18.55 |  |  | 12.81 |  |  | 17.74 |
| Polymerization, °F.[2]: |  |  |  |  |  |  |  |
| IBP [3] | 150 | 153 | 151 |  | 153 | 150 |  |
| 50% condensed | 156 | 159 | 157 |  | 159 | 157 |  |
| 30% condensed | 160 | 161 | 160 |  | 161 | 159 |  |
| 50% condensed | 161 | 164 | 162 |  | 164 | 160 |  |
| 70% condensed | 164 | 167 | 166 |  | 166 | 164 |  |
| 80% condensed | 166 | 168 | 220 |  | 168 | 166 |  |
| 90% condensed | 169 | 265 |  |  | 171 | 172 |  |
| 92% condensed | 206 |  |  |  | 182 | 206 |  |

[1] Mercaptan sulfur content was determined by weighing 0.3-0.5 gm. of the sample into an Erlenmeyer flask containing 40 ml. of a titration solvent containing 5 volumes isopropanol and 3 volumes pyridine, shaking well, and adding 15 ml. of 5% aqueous silver nitrate solution. To the mixture is added 25 ml. water and 1 ml. indicator which comprises a mixture of 1 volume of 0.5 percent thymol blue and 3 volumes of 0.5 percent phenolphthalein in 50 percent ethanol. The mixture was then titrated with 0.05 N NaOH to a dark green end point. Weight percent mercaptan sulfur is then calculated from the relation:

$$\text{wt. percent mercaptan sulfur} = \frac{3.2(VN-BN)}{G}$$

wherein

V = ml. NaOH for sample
B = ml. NaOH for blank
N = normality of NaOH
G = wt. of sample in gms.

[2] The amount of polymerization was determined by distilling the material at 5 mm. Hg absolute pressure with the material boiling above 175° F. being considered polymer.
[3] Initial boiling point.

It is to be noted from the above run that the polysulfide substantially reduced the amount of polymerization upon storage as measured by both the mercaptan sulfur content and by the amount of polymerization.

EXAMPLE II

Additional runs were made comparing ditertiary butyl polysulfide with known inhibitors for other similar type compounds to determine the relative effectiveness of the claimed polysulfide. The results of these runs are tabulated in Table II.

Table II

| Days in Storage (Ambient Temperature) | Volume Percent Polymer (from 5 mm. distillation)[1] | | | Wt. Percent Polymer after 183 days as shown by Mercaptan Sulfur [2] |
|---|---|---|---|---|
|  | 15 | 51 | 183 |  |
| Inhibitor: |  |  |  |  |
| None (control)[3] | 19 |  |  |  |
| 4-tertiarybutyl catechol [3] | 9 |  |  |  |
| 2,6-ditertiarybutyl-4-methylphenol [3] | 18 |  |  |  |
| N,N'-disecondarybutyl paraphenylenediamine [3] | 5 |  |  |  |
| None (control) | 12 | 21 | 58 | 44.0 |
| N-phenyl-2-napthylamine | 41 |  | >95 | 87.7 |
| Ditertiarybutyl polysulfide | 7 | 9 | 14 | 5.8 |
| 2,4-dinitronaphthol | 9 | 12 | 15 | 6.7 |
| Orthoaminophenol | 15 | 19 | 29 | 17.1 |
| Deep freeze (−10° F.) (uninhibited) |  |  | <5 | 6.1 |

[1] Based on material boiling above 175° F. at 5 mm. as hereinbefore described.
[2] Based on 18.55 wt. percent mercaptan sulfur in starting material.
[3] Test suspended after 15 days storage.

It will be seen from the above data that ditertiary butyl polysulfide is an effective inhibitor for the prevention of the polymerization of vinylcyclohexanethiol. It will also be readily seen from the above data that the determination of volume percent polymer and weight percent polymer as shown by mercaptan sulfur are indicative of the type of polymerization apparently occurs, i.e. the polymerization takes place through the sulfur bond rather than through the vinyl bond, possibly through the formation of disulfides.

EXAMPLE III

Additional runs were made to compare the effectiveness of normal butyl polysulfide, ditertiary butyl polysulfide produced as hereinbefore described, elemental sulfur, and ditertiary butyl polysulfide plus sulfur. None of these inhibitors imparted a significant amount of color to the product although the elemental sulfur did have a limited solubility in the mercaptan. The samples were stored at ambient laboratory temperatures after being inhibited with 0.1 weight percent inhibitor based on the monomercaptan of vinylcyclohexene.

Table III

| Days in Storage | Volume percent polymer (5 mm. distillation)[1] | | | Weight percent polymer after 188 days storage (as shown by mercaptan sulfur)[2] |
|---|---|---|---|---|
| | 62 | 121 | 188 | |
| Inhibitor: | | | | |
| None (control) | 30 | 55 | 80 | 66.2 |
| n-Butyl polysulfide | 10 | 12 | 12 | 1.3 |
| t-Butyl polysulfide+sulfur | 12 | 13 | 17 | 5.5 |
| Sulfur | 12 | 13 | 19 | 5.8 |

[1] As described in Example I.
[2] As described in Example I.

It can be seen from the above data that sulfur may be added to the polysulfide in addition to that dissolved with the polysulfide and the mixture is an effective stabilizer for the monomercaptan of vinylcyclohexene.

While certain examples, structures, compositions, and process steps have been described for purposes of illustration the invention is not limited to these. Variation and modification within the scope of the disclosure and the claims can readily be effected by those skilled in the art.

What we claim is:

1. A composition of matter consisting essentially of a vinylcycloalkanethiol and a stabilizing amount of an organic polysulfide represented by the structural formula $R'S_xR''$ wherein $R'$ and $R''$ are alkyl radicals, each alkyl radical having from 1 to 12 carbon atoms, and $x$ is an integer in the range of 3 to 10.

2. The composition of claim 1 wherein said vinylcycloalkanethiol is selected from the group consisting of vinylcyclopentanethiols and vinylcyclohexanethiols represented by the following structural formulas, respectively, (1)
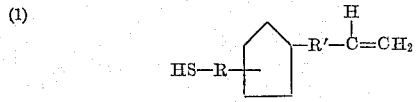

and (2)
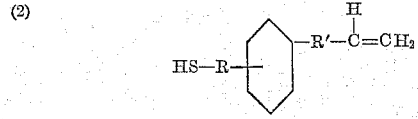

wherein the vinyl and monomercaptan groups may be located at any position on the ring, and R and R' are alkylene groups containing a total number of carbon atoms in the range of 0 to 10.

3. The composition of claim 1 wherein said polysulfide contains free sulfur.

4. The composition of matter consisting essentially of vinylcyclohexanethiol and an amount in the range of 0.01 to 5.0 weight percent based on the vinylcyclohexanethiol of an organic polysulfide represented by the structural formula $R'S_xR''$ wherein $R'$ and $R''$ are alkyl radicals, each alkyl radical having from 1 to 12 carbon atoms and $x$ is an integer in the range of 3 to 8.

5. The composition of claim 4 wherein said organic polysulfide comprises dinormal butyl polysulfide.

6. The composition of matter of claim 4 wherein said organic polysulfide comprises ditertiary butyl polysulfide.

7. The composition of claim 5 wherein said dinormal butyl polysulfide contains free sulfur.

8. The composition of claim 6 wherein said ditertiary butyl polysulfide contains free sulfur.

9. A composition of matter consisting essentially of vinylcyclohexanethiol and an amount in the range of 0.05 to 2.0 weight percent based on the vinylcyclohexanethiol of dinormal butyl polysulfide.

10. A composition of matter consisting essentially of vinylcyclohexanethiol and an amount in the range of 0.05 to 2.0 weight percent based on the vinylcyclohexanethiol of ditertiary butyl polysulfide.

11. A method for stabilizing a vinylcycloalkanethiol comprising incorporating in said vinylcycloalkanethiol a stabilizing amount of an organic polysulfide represented by the structural formula $R'S_xR''$ wherein $R'$ and $R''$ are alkyl radicals, each alkyl radical having from 1 to 12 carbon atoms, and $x$ is an integer in the range of 3 to 10.

12. The process of claim 11 wherein said polysulfide contains free sulfur.

13. A process for preparing a stabilized vinylcyclohexanthiol comprising incorporating in said vinylcyclohexanethiol an amount in the range of 0.01 to 5.0 weight percent based on the vinylcyclohexanethiol of an organic polysulfide represented by the structural formula $R'S_xR''$ wherein $R'$ and $R''$ are alkyl radicals, each alkyl radical havnig from 1 to 12 carbon atoms, and $x$ is an integer in the range of 3 to 8.

14. The process of claim 13 wherein said organic polysulfide comprises dinormal butyl polysulfide.

15. The process of claim 13 wherein said organic polysulfide comprises ditertiary butyl polysulfide.

16. A process for preparing a stabilized vinylcyclohexanethiol comprising incorporating in said vinylcyclohexanethiol an amount in the range of 0.05 to 2.0 weight percent based on the vinylcyclohexanethiol of a dinormal butyl polysulfide.

17. A process for preparing a stabilized vinylcyclohexanethiol comprising incorporating in said vinylcyclohexanethiol an amount in the range of 0.05 to 2.0 weight percent based on the vinylcyclohexanethiol of a ditertiary butyl polysulfide.

References Cited in the file of this patent

UNITED STATES PATENTS

| 2,166,125 | Britton et al. | July 18, 1939 |
| 2,188,772 | Driesbach et al. | Jan. 30, 1940 |
| 2,263,234 | Cloud | Nov. 18, 1941 |
| 2,810,765 | Neuworth et al. | Oct. 22, 1957 |
| 2,842,526 | Smith | July 8, 1958 |

OTHER REFERENCES

Birch et al.: J. Inst. of Petroleum 39 (352) (1953), pp. 206–219.

Reid: Organic Chemistry of Bivalent Sulfur, vol. III, pages 378–391 and 414 (1960), Chemical Publishing Co., New York, N.Y.